United States Patent [19]

Kume et al.

[11] Patent Number: 5,144,614
[45] Date of Patent: Sep. 1, 1992

[54] OPTICAL PICKUP DEVICE

[75] Inventors: Hidehiro Kume, Tokyo; Etsufumi Yamamoto, Kanagawa; Kenji Nagashima, Tokyo, all of Japan

[73] Assignee: Sony Corporation, Tokyo, Japan

[21] Appl. No.: 837,547

[22] Filed: Feb. 14, 1992

Related U.S. Application Data

[63] Continuation of Ser. No. 427,746, Oct. 26, 1989.

[30] Foreign Application Priority Data

Oct. 29, 1988 [JP] Japan .................. 63-274040

[51] Int. Cl.$^5$ .................. G11B 7/00
[52] U.S. Cl. .................. 369/112; 369/44.23; 369/44.41; 369/44.42
[58] Field of Search .............. 369/44.23, 44.41, 44.42, 369/112, 122, 100, 105, 116, 121, 109, 44.12; 250/111, 120, 201

[56] References Cited

U.S. PATENT DOCUMENTS 4,767,921  8/1988  Kawasaki et al. .................. 250/201
4,819,220  4/1989  Miyazaki et al. .................. 369/44.41 X
4,969,137 11/1990  Sugiyama et al. .................. 369/44.11

FOREIGN PATENT DOCUMENTS 0258450  8/1987  European Pat. Off. .
2601173  1/1988  France .
2196115A 4/1988  United Kingdom .

OTHER PUBLICATIONS

Jee Journal of Electronic Engineering, vol. 24, No. 248, Aug. 1987, Tokyo JP, pp. 31-34; Kazuki Urita: "Semiconductor lasers for Optical Memory Disks: High Output and Low Noise Required".

Primary Examiner—Roy N. Envall, Jr.
Assistant Examiner—Hung Dang
Attorney, Agent, or Firm—Limbach & Limbach

[57] ABSTRACT

An optical pickup device is disclosed in which a light beam from a laser light source is converged by an object lens on a signal recording surface of an optical disk to follow recording tracks formed on the signal recording surface to read out or write data on or from the signal recording surface. A semiconductor laser unit is used as a laser light source and is so arranged that the meridional plane of the light beam emanating from the semiconductor laser unit is inclined 30° to 60° with respect to the tangential direction of the recording track.

4 Claims, 7 Drawing Sheets

FIG.1

DE-FOCUSING (−)    FOCUSING    DE-FOCUSING (+)

FIG.2

——— JITTER LEVEL (ns)
- - - TRACKING ERROR (V)
—·— RF SIGNAL LEVEL (V)

FOCUSING   ⟶  DE-FOCUSING

OPTICAL PICKUP DEVICE

This is a continuation of co-pending application Ser. No. 07/427,746, filed on Oct. 26, 1989, now abandoned.

BACKGROUND OF THE INVENTION

1. Field of the Invention

This invention relates to an optical pickup device for recording and/or reproducing signals on or from an optical disk.

2. Related Prior Art

There is so far known an optical pickup device which is provided with a semiconductor laser unit as a light source and in which a light beam emanating from this semiconductor laser unit is converged by a suitable optical system on a signal recording surface of an optical disk to write and/or read data signals on or from the signal recording surface. Examples of this type of the optical pickup device is disclosed in U.S. Pat. Nos. 4,766,583 and 4,751,694. The optical pickup device disclosed therein is provided with a photosensor, such as a photodiode, for detecting the light beam reflected from the signal recording surface of the optical disk.

In such optical pickup device, so-called focusing servo and tracking servo control operations are performed on the basis of signals detected by the photosensor. By these servo control operations, the light beam projected on the signal recording surface may be converged accurately on the signal recording surface even through the optical disk is subjected during its rotation to so-called plane or core deviation, so that a beam spot formed by the convergence of the light beam will correctly trace the spirally or concentrically extending recording track formed on the signal recording surface.

More specifically, for effecting the focusing servo control operation, a focusing error signal indicating the deviation of the beam spot with respect to the signal recording surface of the optical disk in the direction at right angles with the signal recording surface, that is, along the direction of the optical axis of the light beam, is formed, on the basis of the detection output eignal, as disclosed for example in U.S. Pat. No. 4,059,841. Then, on the basis of this focusing error signal, the optical system for converging the light beam on the signal recording surface, such as an object lens, as disclosed in the above U.S. Pat. No. 4,766,583, is controlled so as to be displaced in a direction towards or away from the signal recording surface.

For effecting the tracking servo control operation, a tracking error signal indicating the deviation of the beam spot from a given recording track along the radial direction of the optical disk is formed on the basis of the detection output from the photosensor and in accordance with, for example, a push-pull method as described in the Japanese Patent Publication No. 3273/1986 or a three-beam method as described in the Japanese Patent Publication No. 13123/1978.

Meanwhile, if the size of the above described optical pickup device is to be reduced, it is necessary to reduce the distance between the semicondutor laser unit and the signal recording surface by reducing the size or the focal distance of the optical device adapted for converging the light beam emanating from the semiconductor laser unit on the signal recording surface of the optical disk.

However, when the distance between the semiconductor laser unit and the signal recording surface is reduced, so-called return light to the semiconductor laser unit increases. The return light means the light beam fraction which is reflected by the signal recording surface and returned to the semiconductor laser unit. In general, an increase in the return light results in increase in the laser unit noise or the noise in light intensities to give rise to various inconveniences, such as fluctuations in the light emitting power, such that it may become occasionally impossible to perform correct write and-/or read operations for data signals.

Meanwhile, the semiconductor laser unit may be classified into a so-called refractivity index waveguide type unit oscillating in a single mode and a so-called gain waveguide type unit oscillating in a multiple mode. The gain waveguide type laser unit is subject to the laser unit noise due to return light to a lesser extent than the refractivity index waveguide type unit. Hence, for reducing the size of the optical pickup device, it is more advisable to use the gain waveguide type laser unit than the refractive index waveguide type unit as the light suorce.

Figure 1:
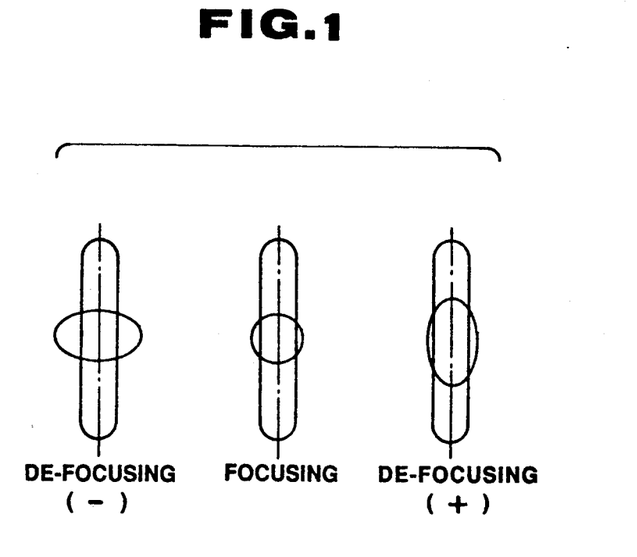
FIG. 1 is a diagrammatic view showing the shape of a beam spot formed on an optical disk with the use of a conventional optical pickup device.

However, the gain waveguide type laser unit exhibits a larger astigmatic difference than the refractivity index waveguide type laser unit. The light beam emitted by the semiconductor laser unit is subject to astigmatism due to the astigmatic difference proper to the semiconductor laser unit. The result is that the beam spot formed on the signal recording surface assumes the shape of an ellipsis having its long axis extending in mutually perpendicular directions depending on the de-focusing direction, as shown in FIG. 1.

Figure 2:
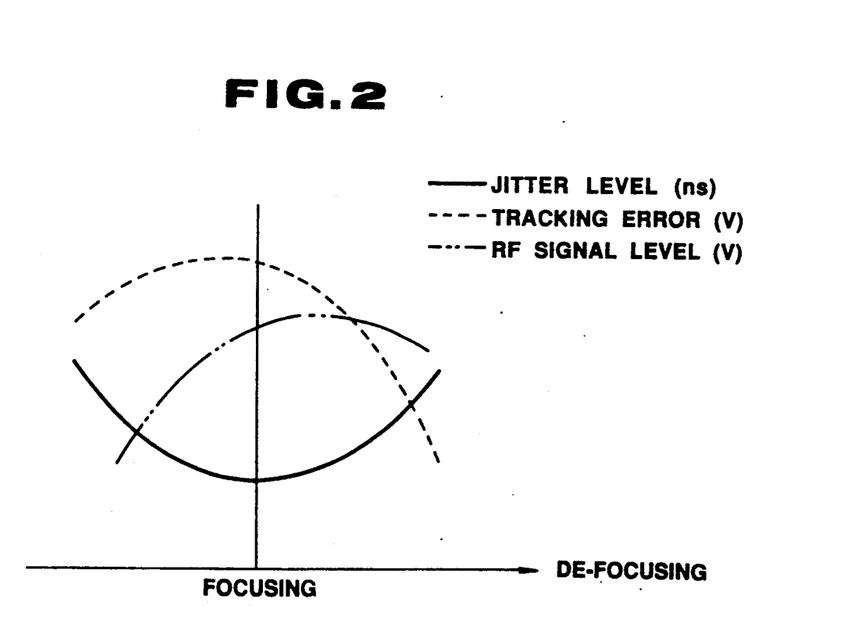
FIG. 2 is a chart showing various characteristics of the conventional optical pickup device.

Referring to FIG. 2, when the beam spot shape is changed as described above on occurrence of de-focusing with resulting fluctuations in the beam spot area measure on the recording track, the maximum level positions of the tracking error signal and the RF signal are not coincident with the focusing position corresponding to the minimum jitter of the read-out or written data signals. That is, the tracking error signal and RF signal levels exhibit non-symmetricity with respect to the focusing position.

As a result of such non-symmetricity of the tracking error signal and RF signal levels with respect to the focusing position, it may become occasionally impossible to effect focusing or tracking servo operations on occurrence of de-focusing due to plane or core deviations of the optical disk.

Conventionally, such astigmatism is corrected by a plane parallel glass which is inclined a predetermined angle with respect to the optical axis of the light beam and which is placed on a light path along which the light beam is dispersed or converged. However, not only it is not possible with the use of the plane parallel correction plate to correct the astigmatism completely, but the use of such correction plate impedes the reduction in size of the optical pickup device.

OBJECT AND SUMMARY OF THE INVENTION

It is an object of the present invention to provide an optical pickup device in which the effect of the astigmatic difference proper to the semiconductor laser unit may be sufficiently corrected and the properties of the device associated with de-focusing may be improved.

It is another object of the present invention to provide an optical pickup device in which astigmatism may be corrected without using a correction plate consisting of a plane parallel plate.

It is still another object of the present invention to provide an optical pickup device which is reduced in size through using a semiconductor laser unit, which is affected to a lesser extent by the return beam, such as a gain waveguide type unit.

For accomplishing the above objects, the optical pickup device according to the present invention is so designed that the light beam emanating from the semiconductor laser unit as the light source is projected on an optical disk having circumferentially extending recording tracks to effect reading and/or writing of data signals, wherein the semiconductor laser unit is so arranged that the meridional plane perpendicular to the junction surfaces of semiconductor layers of the semiconductor laser unit is provided in such a manner that the light beam is projected on the optical disk at such an angle with respect to a tangential line drawn to a recording track on the optical disk that non-symmetricity of the beam spot of the light beam on the optical disk about the tangential line, which is brought about as a function of defocusing of the light beam on the optical disk, may be compensated.

By providing the meridional plane of the light beam at a predetermined angle with respect to the tangential line drawn to the recording track of the optical disk, asymmetry of the beam spot on the disk about the tangential line, which is brought about in dependence upon the de-focusing direction, may be compensated, so that, even in cases wherein the light beam emanating from the semiconductor laser unit undergoes astigmatism, the reflected light from the recording track is not changed in intensity as a function of the de-focusing direction.

The more detailed construction of the present invention will become clearer from the following detailed description of the preferred embodiments which is made in conjunction with the accompanying drawings.

DETAILED DESCRIPTION OF PREFERRED EMBODIMENT

By referring to the drawings a preferred embodiment of the present invention will be explained in more detail.

Figure 3:
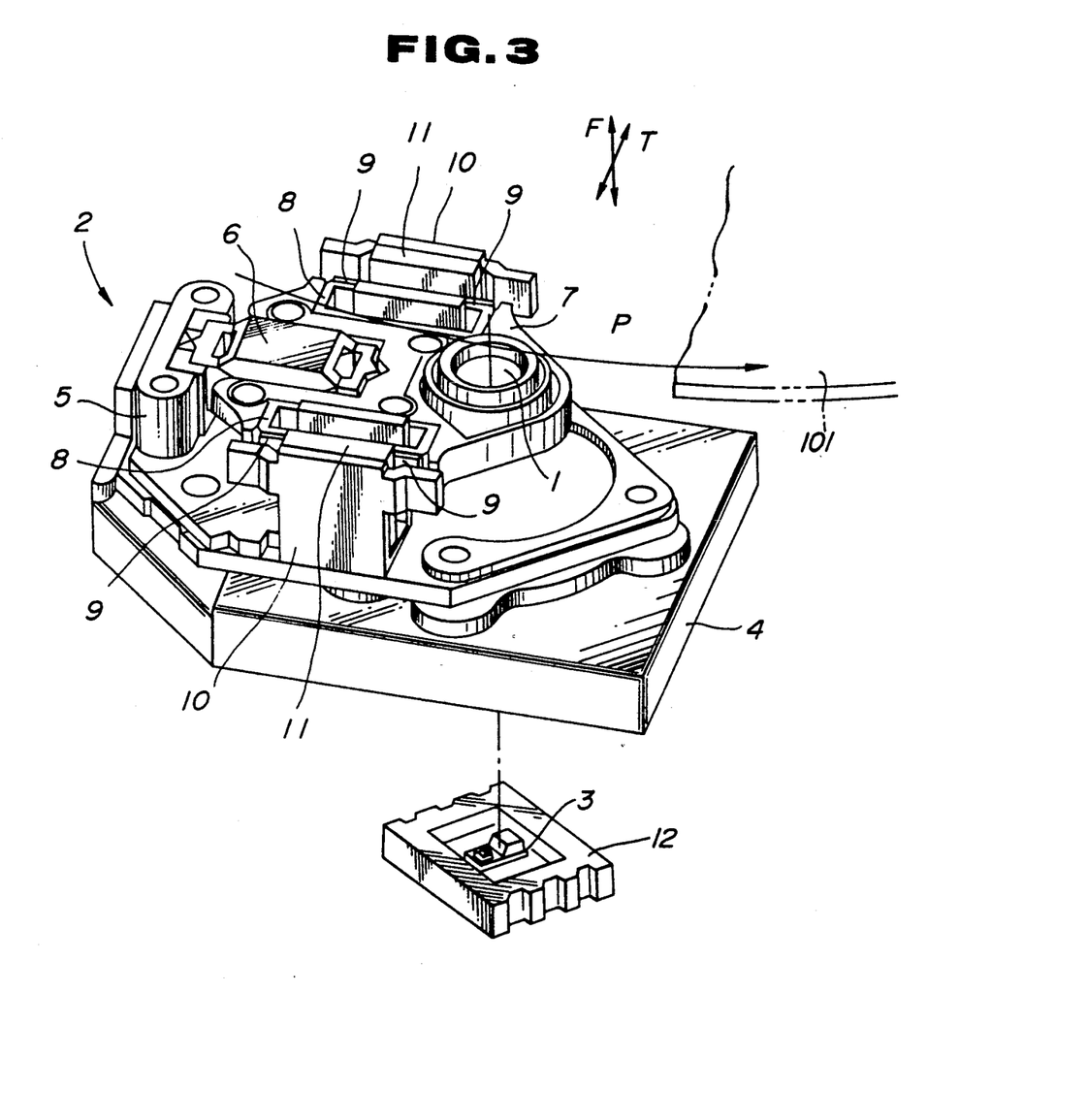
FIG. 3 is a perspective view showing an optical pickup device according to the present invention.

As shown in FIG. 3, an optical pickup device according to the present invention is comprised of an object lens driving section 2 for displacing an object lens 1 in two directions orthogonal to each other, as later described, and a light emitting and receiving composite element 3 provided with a semiconductor laser unit and a light receiving element, not shown. The object lens 1 is adapted for converging a light beam projected on an optical disk 101 on the signal recording surface of the disk 101.

The object lens driving section 2 includes a lens bobbin 7 supported movably in two mutually orthogonal directions via movable arm member 6 on a supporting section 5 supported by a supporting substrate 4. The movable support arm member 6 is formed of a resilient material, such as synthetic resin, and is provided with first and second hinges 6a, 6b. These hinges 6a, 6b are of reduced thicknesses and may be displaced in two mutually orthogonal directions as later described.

The lens bobbin 7 is provided with the object lens 1, a pair of focusing coils 8 and two pairs of tracking coils 9. A pair of magnets 11 are attched by means of a pair of yoke sections 10 suspendedly mounted to the supporting substrate 4. These magnets 11 are arranged in opposition to the focusing and tracking coils 8, 9. These coils 8, 9, yoke section 10 and the magnets 11 make up a magnetic circuit. Thus, when the focusing drive current based on the focusing error signal is supplied to the focusing coil 8, the lens bobbin 7 is displaced along the axis of the object lens 1, shown by the arrow mark in FIG. 3, that is, in the focusing direction. On the other hand, when the tracking driving current based on the tracking error signal is supplied to the tracking coil 9, the lens bobbin 7 is displaced in the direction at right angles with the optical axis of the object lens L indicated by the arrow mark T in FIG. 3, that is, in the tracking direction.

This object lens driving unit 2 is provided so that the object lens 1 faces to the optical disk 101. At this time, the optical axis of the object lens 1 is approximately at right angles with the surface of the optical disk 101, while the tracking direction is approximately at right angles with the tangential direction of the recording track $t_R$ formed along the circumference of the optical disk 101, as indicated by an arrow mark P in FIG. 3.

Figure 4:
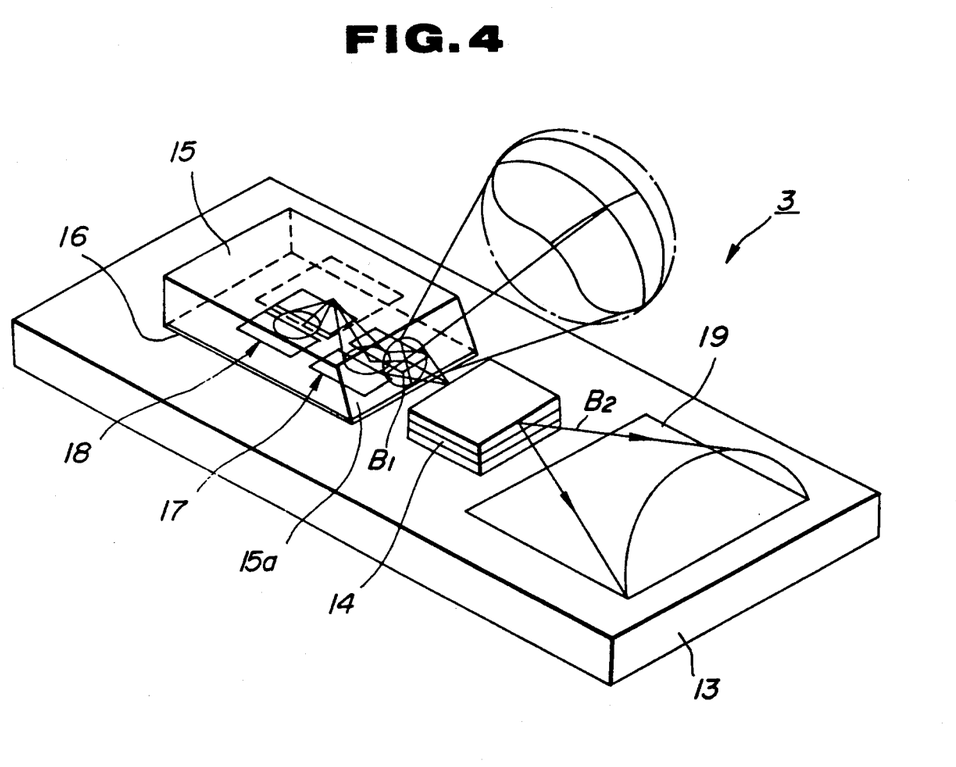
FIG. 4 is a perspective view showing an arrangement of a light emitting/receiving composite element of the optical pickup device.

The light emitting/receiving composite element 3 is mounted within a package 12 and, as shown in FIG. 4, is provided with a semiconductor substrate 13. On this semiconductor substrate 13, there is provided a semiconductor laser unit 14 formed by a lamination of semiconductor layers, inclusive of the substrate 13. The semiconductor laser unit 14 is a so-called gain-waveguide type semiconductor laser unit performing a multi-mode oscillation and adapted to undergo lesser unit noises due to the return light beam from the optical disk 101.

This semiconductor laser unit 14 exhibits so-called astigmatic difference and the light beam emanating from this laser unit 14 undergoes astigmatism. That is, the apparent light emitting position within the meridional plane of the light beam, viz. the plane perpendicular to the junction surfaces of the semiconductor layers making up the semiconductor laser unit 14 and including the optical axis, is at the end face position of the semiconductor laser unit 14, whereas the apparent light emitting position within the sagittal plane of the light beam, that is, the plane parallel to the aforementioned junction surface and inclusive of the optical axis, is at a position recessed from the end face by about 20 to 30 μm into the interior of the semiconductor laser unit 14. Consequently, the equiphase wave surface of this light beam is bent most prominently within the meridional plane, with the curvature becoming least within the sagittal plane.

In a direction along which one light beam $B_1$ is emitted from the semiconductor laser unit 14, there is secured a beam splitter prism 15 on the semiconductor substrate 13, such as with an adhesive, for confronting to the laser unit 14. This beam splitter prism 15 has its side confronting to the semiconductor laser unit 14 inclined by a predetermined angle with respect to the optical axis of the light beam from the semiconductor laser unit 14 and coated by a transmitting/reflecting film 15a. That is, the light beam $B_1$ emanating from the semiconductor laser unit 14 is partially reflected by the transmitting/reflecting film 15a so as to exit from the substrate 13 at a predetermined angle.

On the semiconductor substrate 13 and at an area where the beam splitter prism 15 is provided, there are formed first and second split detectors 17, 18, that is, light receiving units each composed of a plurality of light receiving elements.

In a direction along which another light beam $B_2$ is emitted from the semiconductor laser unit 14, there is formed a monitoring detector 19 on the semiconductor substrate 13 for receiving the other light beam $B_2$. This monitoring detector 19 functions to detect the intensity of the light beam emitted by the semiconductor laser unit 14 to control the light emitting power of the semiconductor laser unit 14 on the basis of the detected light intensity with use of an automatic power control circuit, not shown.

Figure 6:
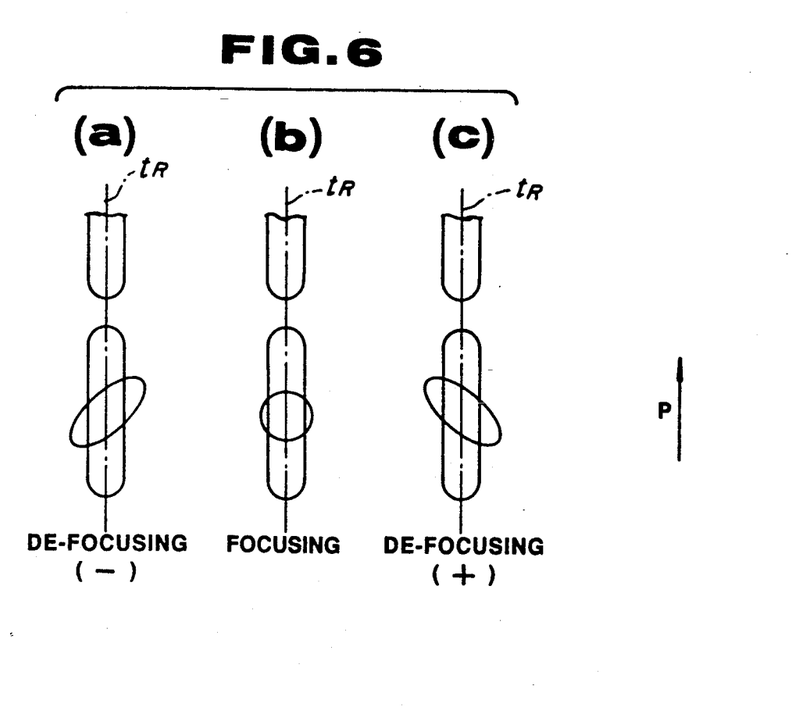
FIG. 6 is a diagrammatic view showing the shape of a light spot formed on the optical disk with the use of the optical pickup device shown in FIG. 3.

The light beam exiting the light emitting/receiving composite unit 3 is incident on the object lens 1, as shown in FIG. 3, so as to be projected on the signal recording surface of the optical disk 101. Meanwhile, the light emitting/receiving composite element 3 is provided so that the meridional surface of the light beam is at an angle of approximately 45° with respect to the tangential direction of the recording track $t_R$ of the optical disk 101 indicated by the arrow mark P in FIG. 3. Therefore, should a so-called de-focusing occur, the beam spot formed on the signal recording surface assumes the shape of an ellipsis having its long axis inclined by about 45° with respect to the recording track $t_R$, as indicated in FIG. 6(a) and (c).

The light beam projected on the signal recording surface is reflected by this recording surface before again reaching the transmitting/reflecting film 15a by way of the object lens 1. The light beam thus again reaching the transmitting/reflecting film 15a is transmitted through the film 15a to proceed into the beam splitter prism 15 before being received by the first and the second split detectors 17, 18 via a prescribed light path.

Figure 5A:
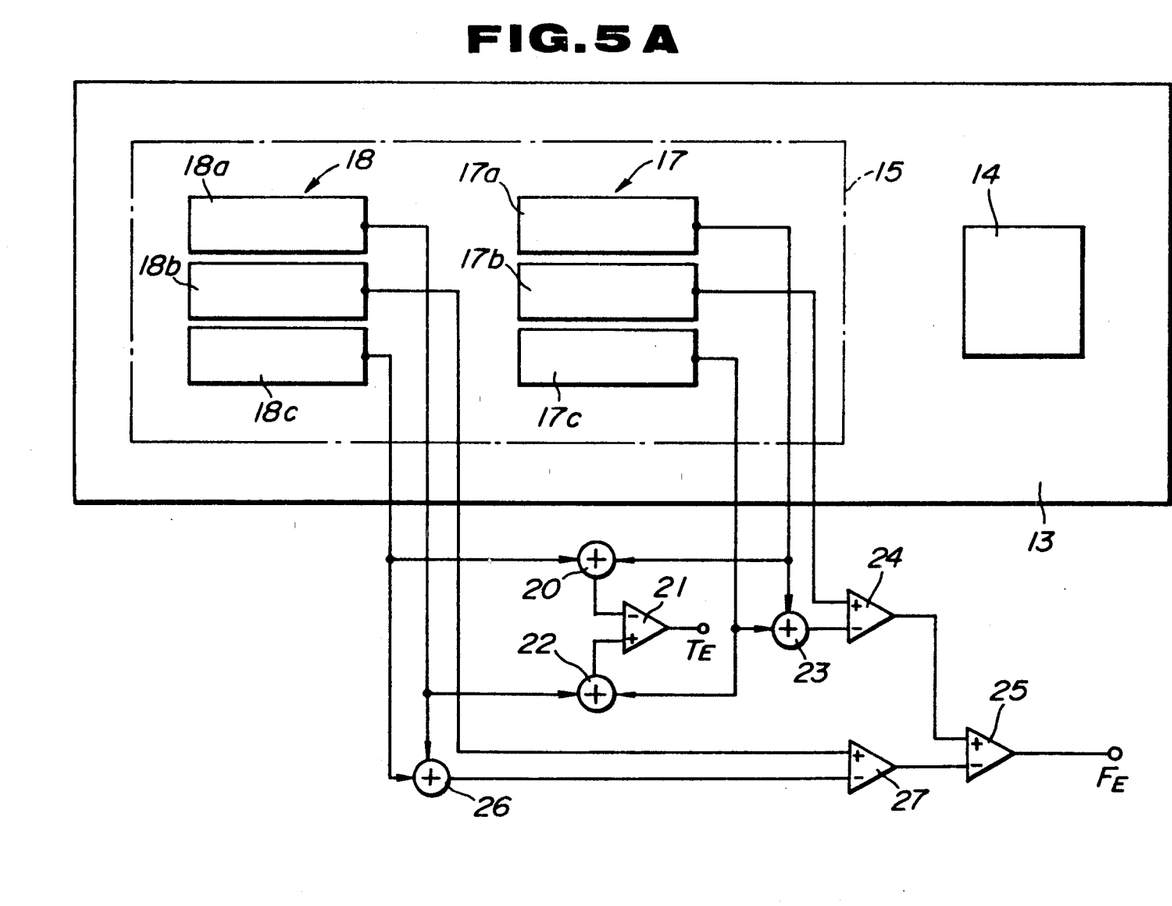
FIG. 5A is a diagrammatic view showing an arrangement of split detectors of the light emitting/receiving composite element and a circuit for processing output signals of the split detectors.
Figure 5B:
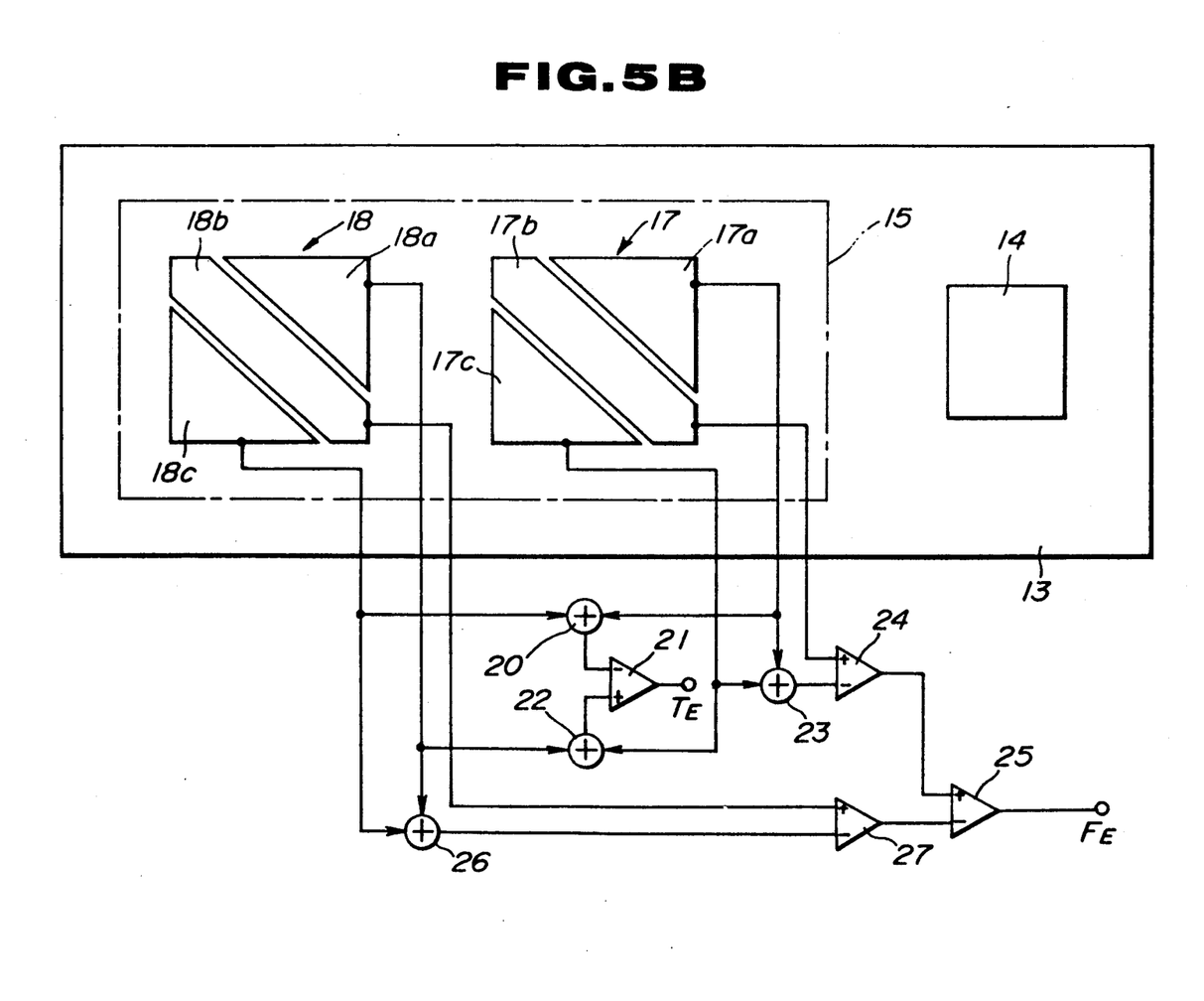
FIG. 5B is a diagrammatic view showing a modification of the split detectors of the light emitting/receiving composite element.

As shown in FIGS. 5A and 5B, the split detectors 17, 18 are split into first to third light receiving elements 17a, 17b, 17c; 18a, 18b, 18c, respectively, along split lines extending parallel to one another.

In the embodiment shown in FIG. 5A, the light receiving elements of the split detectors 17, 18 are arrayed parallel to the meridional plane of the light beam, whereas, in the embodiment shown in FIG. 5B, the light receiving elements of the split detectors 17, 18 are arrayed parallel to the tangential line drawn to the recording tracks $t_R$.

The output of the first light receiving element 17a of the first split detector 17 and the output of the third light receiving element 18c of the second split detector 18 are combined by a first adder 20 before being supplied to an inverting input terminal of a first substractor 21. The output of the third light receiving element 17c of the first split detector 17 and the output of the first light receiving element 18a of the second split detector 18 are combined by a second adder 22 before being supplied to a non-inverting input terminal of the first subtrator 21. The output of the second subtractor 21 represents a tracking error signal $T_E$.

On the other hand, the outputs of the first light receiving element 17a and the third light receiving element 17c of the first split detector 17 are summed together by a third adder 23 before being supplied to a non-inverting input terminal of a second subtractor 24. This non-inverting input terminal of the second subtractor 24 is supplied with an output of the second light receiving element 17b of the first split detector 17. The output signal of the second subtractor 24 is supplied to a non-inverting input terminal of a third subtractor 25.

The outputs of the first light receiving element 18a and the third light receiving element 18c of the second light receiving element 18 are combined by a fourth adder 26 before being transmitted to a non-inverting input terminal of a fourth subtractor 27. To the non-inverting input terminal of this fourth split detector 18 is supplied the output of the second light receiving element 18b of the second split detector 18. The output signal of this fourth subtractor 27 is transmitted to an inverting terminal of the third subtractor 25. The output signal of this third subtractor 25 represents a focusing error signal $F_E$.

The sum of the output signals of the split detectors 17 and 18 represents the data read-out signal (RF signal).

Figure 7:
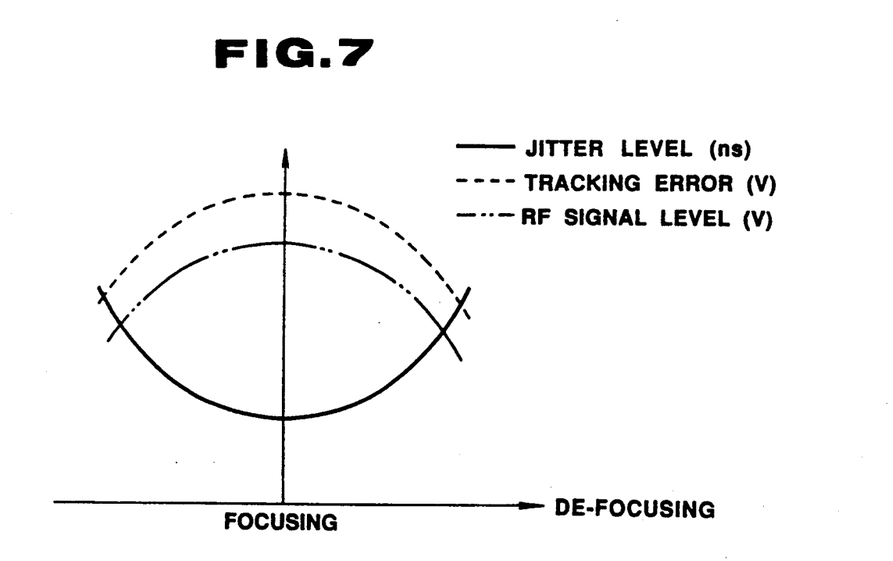
FIG. 7 is a chart showing various features of the optical pickup device according to the present invention.

In the above described optical pickup device of the present invention, should the so-called de-focusing occur, as shown in FIG. 6(a) and (c), no difference in the beam spot area measure on the recording track $t_R$ is caused with the direction in which the de-focusing has occurred. For this reason, in the present optical pickup device, with the focusing position being the position at which the jitter in the data signals read from or written on the optical disk 101 is minimized, this de-focusing position is coincident with the position at which the level of the tracking error signal $T_E$ and that of the RF signal become maximum, as shown in FIG. 7. That is the symmetrical relation of the levels of the RF signal and the tracking error signal $T_E$ with respect to the focusing position is maintained.

Inasmuch as the symmetry of the levels of the RF signal and the tracking error signal $T_E$ with respect to the focusing position is maintained in this manner, so-called de-servoeing is less likely to occur at the time of de-focusing caused by the plane or core deviation of the optical disk 101.

Figure 8:
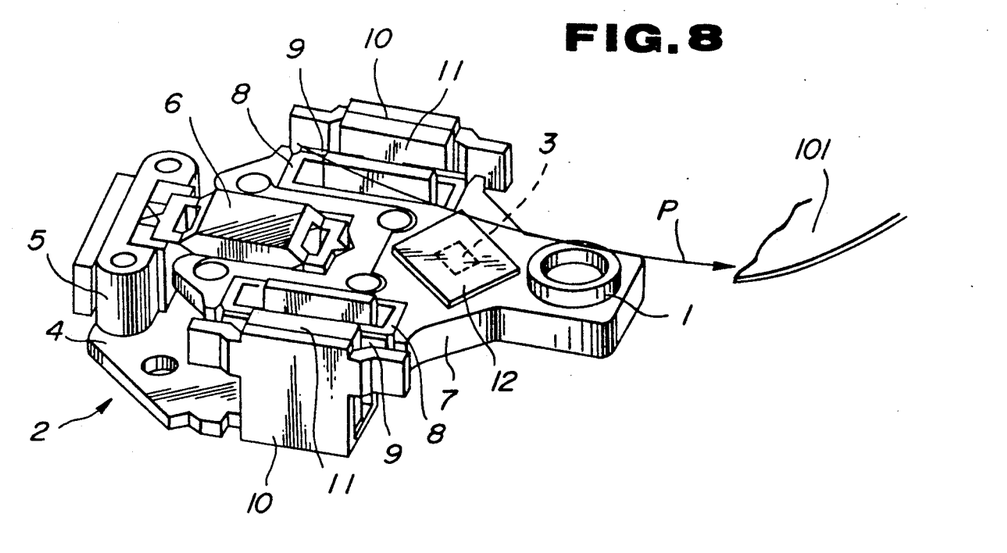
FIG. 8 is a perspective view showing a modification of the optical pickup device according to the present invention.
Figure 9:
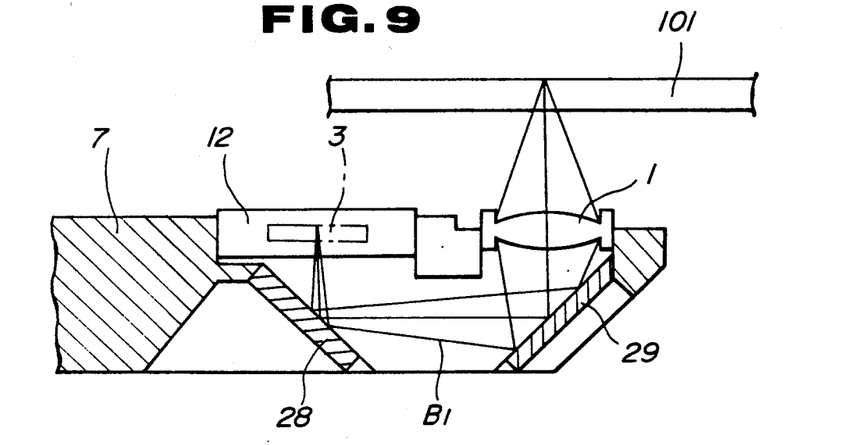
FIG. 9 is a longitudinal cross-sectional view showing essential parts of the optical pickup device shown in FIG. 8.

In the optical pickup device of the present invention, as shown in FIG. 8, the package 12 mounting the above described light emitting/receiving composite element 3 may be provided on the lens bobbin 7. In the present embodiment, as shown in FIG. 9, a light beam Bj emanating from the semiconductor unit 14 is guided by first and second mirrors 28, 29 mounted on the lens bobbin 7 before being incident on the object lens 1 mounted on the lens bobbin 7.

In the present embodiment, the light emitting/receiving element 3 is similarly arranged so that the meridional plane of the light beam is at an angle of approximately 45° with respect to the tangential direction of the recording track $t_R$ of the optical disk 101. Hence, should a so-called defocusing occur, the beam spot formed on the signal recording surface assumes the shape of an ellipsis having its long axis extending at an angle of approximately 45° with respect to the recording track $t_R$, as indicated in FIG. 6. In this manner, the symmetrical relation of the signal levels of the tracking error signal. $T_E$ and the RF signal may be maintained with respect to the focusing position, as shown in FIG. 7.

Figure 10:
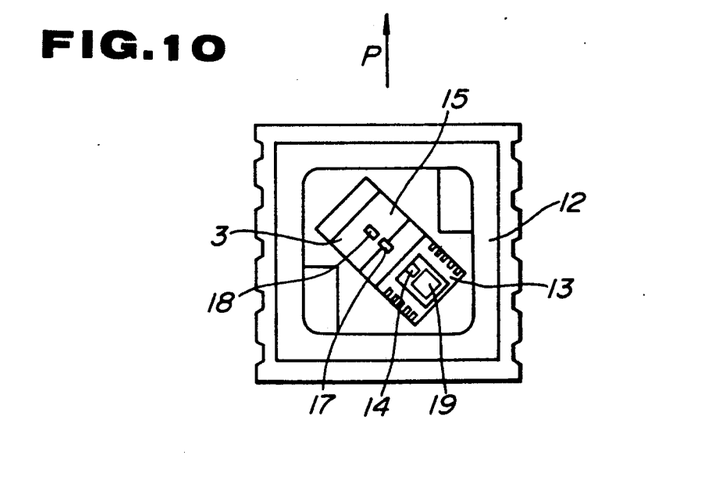
FIG. 10 is a plan view showing an alternative mounting state of the light emitting/receiving element of the optical pickup device.

In the above described embodiments, the light emitting/receiving composite element 3 may also be mounted at an angle of approximately 45° with respect to the package 12, as shown in FIG. 10. With the use of the thus mounted light emitting/receiving composite element 3, should the outer lateral side of the package 12 be positioned on the basis of the reference plane made parallel to the tangent of the recording track $t_R$, for example, the meridional plane of the light beam emanating from the light emitting/receiving element 3 may be set at a predetermined angle with respect to the tangential line to facilitate the assembly operation.

In the above described embodiments, the angle between the meridinal plane and the tangential line to the recording track $t_R$ is not limited to 45°. For example, it may be in the range of from 30° to 60° to maintain sufficient symmetry of the signal levels of the tracking error signal $T_E$ and the RF signal with respect to the focusing position.

The present invention also is not limited to the above described embodiments of the optical pickup device provided with the light emitting/receiving composite element, but may be applied to an optical pickup device in which the semiconductor laser unit and the light receiving element are provided separately in a frame of the optical system.

According to the optical pickup device of the prsent invention, as described hereinabove, the non-symmetricity of the beam spot emanating from the semiconductor laser unit with respect to the tangential line drawn to the recording track on the optical disk, which is brought about as a function of the de-focusing direction due to astigmatism of the light beam, may be compensated, so that the intensity of the reflected light from the recording track does not differ as a function of the defocusing direction.

Thus the present invention provides an optical pickup device which is reduced in size through the use of a semiconductor laser unit which is less subject to the return light beam from, for example, the gain waveguide type leser unit and in which the effect caued by the astigmatic difference proper to the semiconductor laser unit may be sufficiently compensated to improve the properties associated with de-focusing.

What is claimed is:

1. An optical pickup device for transmitting a light beam having a meridional plane from a laser light source to a signal recording surface of an optical disk, to enable the light beam to follow recording tracks formed on the signal recording surface, including:
    an object lens disposed adjacent the optical disk;
    a semiconductor laser unit for generating the light beam and directing the light beam onto the object lens, wherein the semiconductor laser unit is object lens, wherein the semiconductor laser unit is oriented relative to the object lens such that the meridional plane of the light beam projected through the object lens onto said optical disk is oriented at an angle substantially equal to 45 degrees with respect to an tangential line drawn to said recording tracks, wherein the semiconductor laser unit is a gain waveguide type unit including:
    a semiconductor substrate; and
    a light emitting/receiving composite element comprising a beam splitting prism affixed on the semiconductor substrate, and at least a pair of split detectors formed on the semiconductor substrate at an area of the semiconductor substrate at which the beam splitting prism is affixed, wherein each of said split detectors includes a first light receiving element, a second light receiving element separated from the first light receiving element by a first split line, and a third light receiving element separated from the second light receiving element by a second split line, wherein each of the first split line and the second split line is oriented substantially parallel to the meridional plane.

2. The optical pickup device according to claim 1, wherein the gain waveguide type unit also includes a package accommodating said light emitting/receiving composite element, wherein the package has an outer edge, and wherein said package is mounted with the outer edge oriented at an angle substantially equal to 45 degrees with respect to a tangential line drawn to the recording tracks.

3. The optical pickup device according to claim 1, wherein the gain waveguide type unit also includes a package having an outer edge, and wherein said light emitting/receiving composite element is accommodated within said package at an angle substantially equal to 45 degrees with respect to the outer edge.

4. An optical pickup device, comprising:
    an object lens disposed adjacent an optical disc;
    a light emitting/receiving composite element including a semiconductor substrate, a semiconductor laser unit emitting alight beam having a meridional plane to a signal recording region of the optical disc through said objective lens, said semiconductor laser unit being provided on said semiconductor substrate, a beam splitting prism affixed on the semiconductor substrate and at least a pair of split detectors formed on the semiconductor substrate at an area of the semiconductor substrate at which the beam splitting prism is affixed, wherein each of said split detectors includes a first light receiving element, a second light receiving element separated from the first light receiving element by a first split line, and a third light receiving element separated from the second light receiving element by a second split line, wherein each of the first split line and the second split line is oriented substantially parallel to the meridional plane, supporting means supporting said objective lens and said light emitting-/receiving composite element, and a driving means for translating said supporting means in a focussing direction according to a focussing error signal, said focusing error signal being generated from output signals from the split detectors, wherein said semiconductor laser unit is oriented relative to the objective lens such that the meridional plane of the light beam projected through said objective lens onto the optical disc is oriented at an angle substantially equal to 45 degrees with respect to a tangential line drawn to recording tracks of the optical disc, and wherein the semiconductor laser unit is a gain wavelength type unit.

* * * * *